United States Patent
Kawaguchi et al.

(10) Patent No.: US 6,857,676 B2
(45) Date of Patent: Feb. 22, 2005

(54) VEHICULAR CIGARETTE LIGHTER DEVICE

(75) Inventors: Hiroyuki Kawaguchi, Hamamatsu (JP); Daisuke Suzuki, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 10/726,403

(22) Filed: Dec. 3, 2003

(65) Prior Publication Data

US 2004/0119308 A1 Jun. 24, 2004

(30) Foreign Application Priority Data

Dec. 18, 2002 (JP) ........................................ 2002-365966

(51) Int. Cl.[7] .............................................. B60N 3/12
(52) U.S. Cl. ........................................................ 296/37.9
(58) Field of Search ....................... 296/37.9; 131/231, 131/235.1, 242

(56) References Cited

U.S. PATENT DOCUMENTS

| | | | | | |
|---|---|---|---|---|---|
| 1,702,723 A | * | 2/1929 | De Boer | .................. | 296/37.9 |
| 2,221,211 A | * | 11/1940 | Visser | ...................... | 296/37.9 |
| 2,254,861 A | * | 9/1941 | Visser | ...................... | 296/37.9 |
| 2,812,097 A | * | 11/1957 | Legge | ....................... | 296/37.9 |
| 3,708,180 A | * | 1/1973 | Bird | .......................... | 296/37.9 |
| 4,466,449 A | * | 8/1984 | Summers | .................. | 296/37.9 |
| 4,494,806 A | * | 1/1985 | Williams et al. | .......... | 296/37.9 |
| 4,720,131 A | * | 1/1988 | Grote | ....................... | 296/37.9 |
| 4,852,932 A | * | 8/1989 | Komeya et al. | .......... | 296/37.9 |

FOREIGN PATENT DOCUMENTS

EP          000546873 A1 *   6/1993    ................ 296/37.9

OTHER PUBLICATIONS

Japanese Utility Model Provisional Publication No. 62–6147, Jan. 14, 1987.

* cited by examiner

*Primary Examiner*—Lori L. Coletta
(74) *Attorney, Agent, or Firm*—Trop, Pruner & Hu, P.C.

(57) ABSTRACT

In the present invention, a floor console arranged between right and left seats of a vehicle is formed by a front-side console 2 and a garnish 15 installed to the front-side console 2; a cigarette lighter attachment portion 32 having a substantially horizontal surface shape is provided on the garnish 15; a cigarette lighter device 1 is disposed in the cigarette lighter attachment portion 32 so as to be directed in a substantially vertical direction; and a substantially horizontal ash receiving surface 37 which is formed separately from an ashtray is provided on the front-side console 2 located under the cigarette lighter attachment portion 32.

3 Claims, 8 Drawing Sheets

VEHICULAR CIGARETTE LIGHTER DEVICE

BACKGROUND OF THE INVENTION AND RELATED ART STATEMENT

1. Field of the Invention

The present invention relates to a cigarette lighter device mounted on a vehicular floor console or the like.

2. Description of Related Art

Conventionally, for driver's convenience, a vehicular cigarette lighter has been assembled to an instrument panel, a floor console, or the like. Also, cigarette lighters have been disposed at a side position or an upper position of an ashtray in view of their properties (see Japanese Utility Model Provisional Publication No. 62-6147). As a conventional example, there is also available an ashtray in which a cigarette lighter is incorporated.

However, from a structural viewpoint, the above-described conventional cigarette lighter has a possibility that cigarette ash adhering to the lighter may drop, so that a floor etc. in a cabin may be made dirty. Also, some ashtrays incorporating a cigarette lighter have a mechanism such that cigarette ash adhering to the lighter drops into the ashtray. In this case, the layout must be such that the cigarette lighter and the ashtray are necessarily located at fixed positions, which poses a problem of restricted degree of freedom of design.

OBJECT AND SUMMARY OF THE INVENTION

The present invention has been made in view of the above situation, and accordingly an object thereof is to provide a vehicular cigarette lighter device which can prevent the interior of a cabin from being made dirty by ash dropping from a cigarette lighter and can increase the degree of freedom of layout of the cigarette lighter and ashtray.

To solve the problems with the above-described prior art, in the present invention, a cigarette lighter attachment portion having a substantially horizontal surface shape is provided on the inside surface of a cabin; a cigarette lighter is disposed in the cigarette lighter attachment portion so as to be directed in a substantially vertical direction; and a substantially horizontal ash receiving surface which is formed separately from an ashtray is provided under the cigarette lighter attachment portion.

Also, in the present invention, a floor console arranged between right and left seats of a vehicle is formed by a console body and a garnish installed to the console body; a cigarette lighter attachment portion having a substantially horizontal surface shape is provided on the garnish; a cigarette lighter is disposed in the cigarette lighter attachment portion so as to be directed in a substantially vertical direction; a substantially horizontal ash receiving surface which is formed separately from an ashtray is provided on the console body located under the cigarette lighter attachment portion; a work opening is formed at the peripheral edge portion of the ash receiving surface; and the garnish is installed at the work opening.

In the present invention, the lower side surface portion of the cigarette lighter attachment portion of the garnish is surrounded by a garnish side wall and a storage compartment side wall.

Also, in the present invention, a convex portion is formed at the side end portion of the ash receiving surface. Further, in the present invention, the ash receiving surface is molded integrally with the cigarette lighter attachment portion.

As described above, in a vehicular cigarette lighter device in accordance with the present invention, the cigarette lighter attachment portion having a substantially horizontal surface shape is provided on the inside surface of the cabin; the cigarette lighter is disposed in the cigarette lighter attachment portion so as to be directed in a substantially vertical direction; and the substantially horizontal ash receiving surface which is formed separately from the ashtray is provided under the cigarette lighter attachment portion. Therefore, the interior of cabin can be prevented from being made dirty by ash which drops from the cigarette lighter and flies around, and the degree of freedom of the layout of the cigarette lighter and ashtray can be increased.

Also, in a vehicular cigarette lighter device in accordance with the present invention, the floor console arranged between right and left seats of a vehicle is formed by the console body and the garnish installed to the console body; the cigarette lighter attachment portion having a substantially horizontal surface shape is provided on the garnish; the cigarette lighter is disposed in the cigarette lighter attachment portion so as to be directed in a substantially vertical direction; the substantially horizontal ash receiving surface which is formed separately from the ashtray is provided on the console body located under the cigarette lighter attachment portion; the work opening is formed at the peripheral edge portion of the ash receiving surface; and the garnish is installed at the work opening. Therefore, the same effects as those of the above-described invention can be achieved. In addition, because a work opening having a large opening area is obtained, handling of cigarette lighter harness can be made easy, so that the assembling workability can be improved.

Further, in a cigarette lighter device in accordance with the present invention, if the lower side surface portion of the cigarette lighter attachment portion of the garnish is surrounded by the garnish side wall and the storage compartment side wall, or the convex portion is formed at the side end portion of the ash receiving surface, ash dropping from the cigarette lighter can be guided to the ash receiving surface, and hence ash can be prevented from dropping and flying around. Also, by temporary placing of the cigarette lighter harness, the assembling workability can further be improved.

DETAILED DESCRIPTION OF PREFERRED EMBODIMENTS

The present invention will now be described in detail with reference to an embodiment shown in the accompanying drawings.

Figure 5:
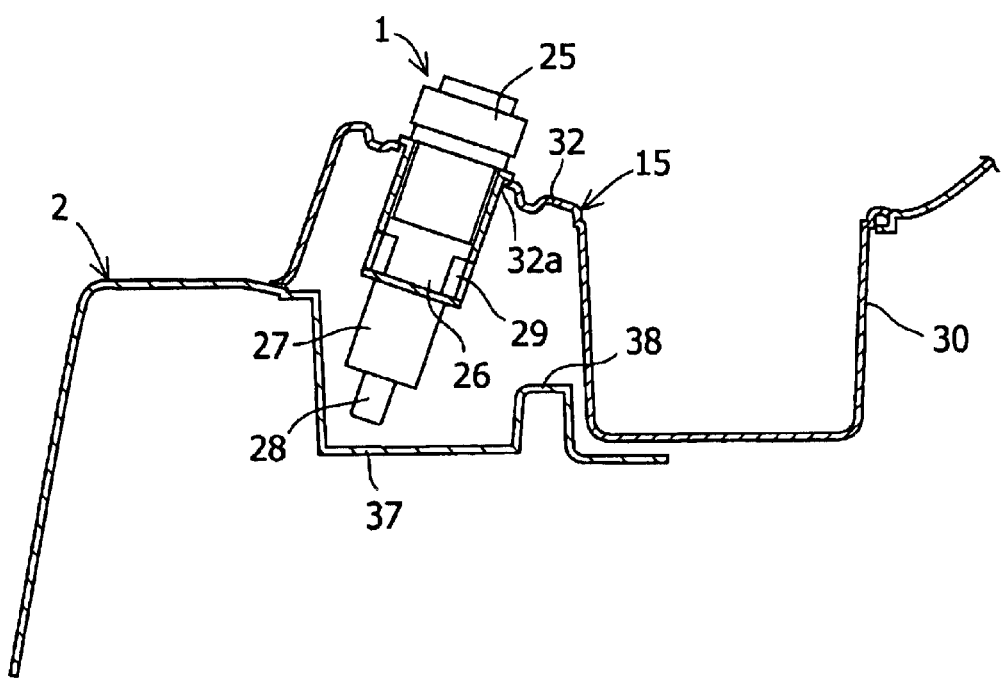
FIG. 5 is a sectional view taken along the line B-B of FIG. 4.
Figure 6:
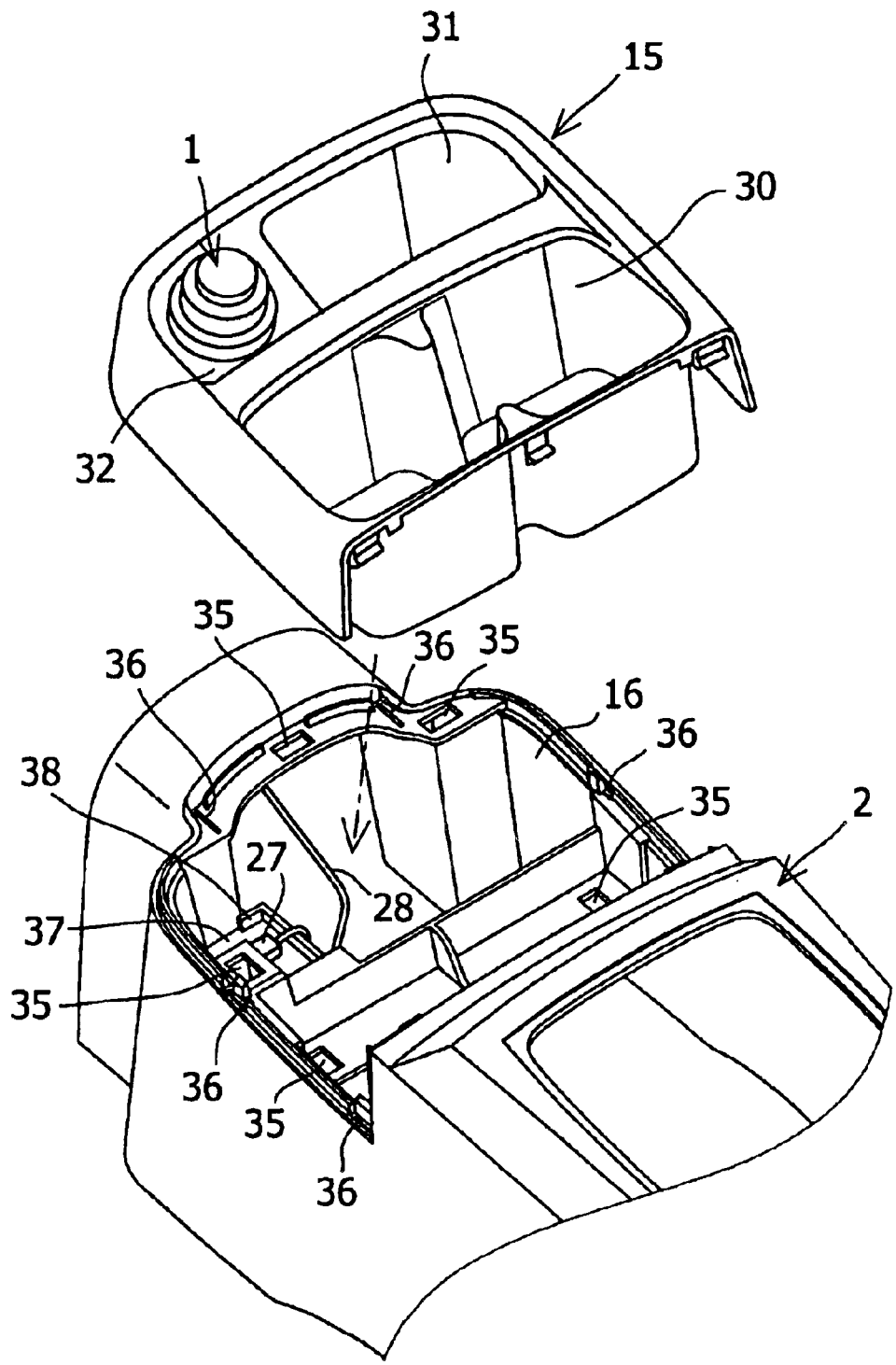
FIG. 6 is an exploded perspective view of a floor console, showing a state in which a cigarette lighter harness is placed temporarily and is not yet connected to a garnish.
Figure 7:
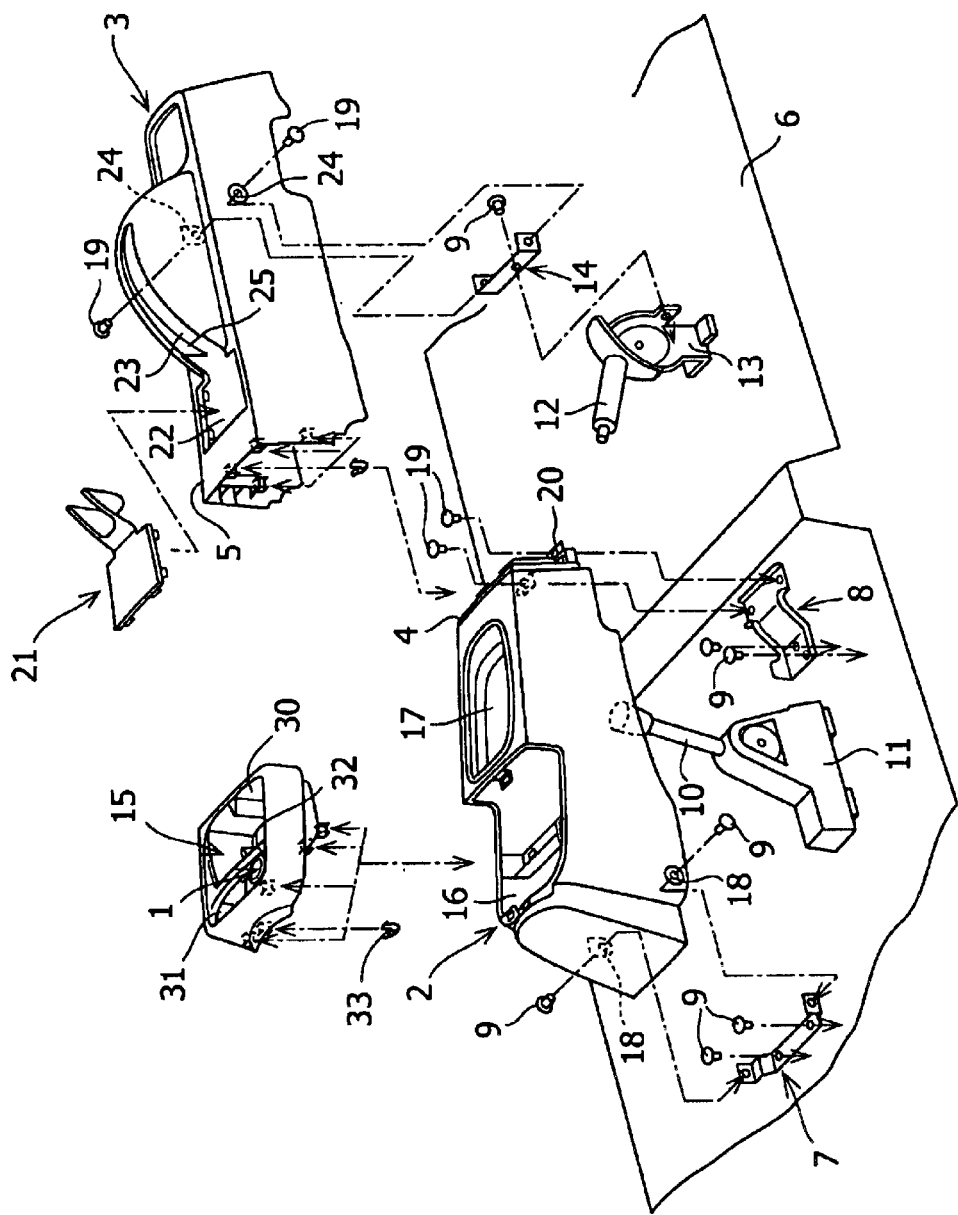
FIG. 7 is an exploded perspective view of a split type floor console box in accordance with an embodiment of the present invention.
Figure 8:
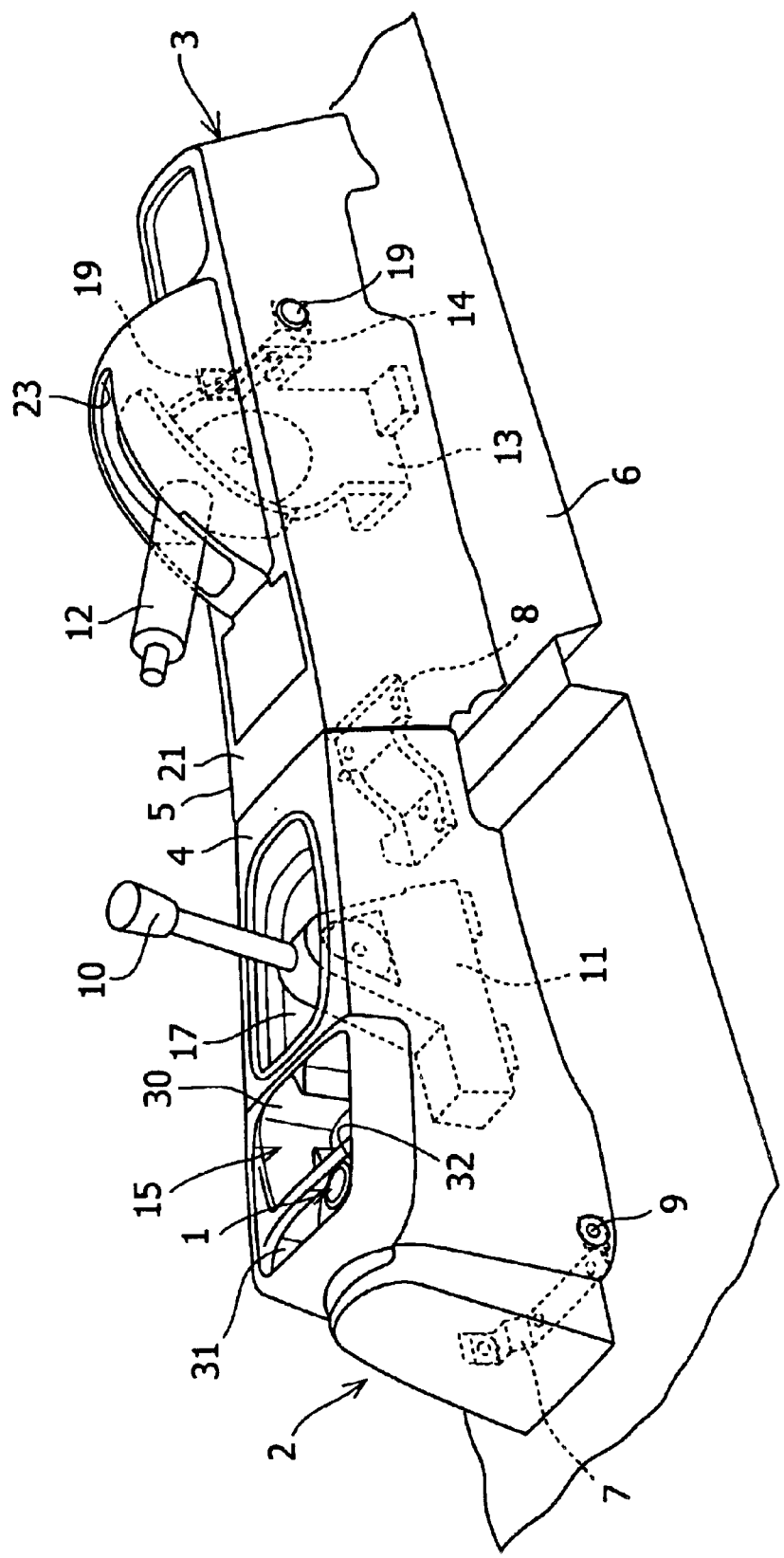
FIG. 8 is a perspective view showing a state in which the floor console box shown in FIG. 7 is assembled.

FIGS. 1 to 8 show an embodiment of a vehicular cigarette lighter device in accordance with the present invention. A cigarette lighter device 1 in this embodiment is a type which is assembled to a split type floor console box. As shown in FIGS. 7 and 8, the floor console box is made up of a front-side console (console body) 2 and a rear-side console 3, and is disposed in the vehicle longitudinal direction between right and left front seats (not shown) in a cabin of a vehicle. The floor console box is constructed so as to be assembled onto a floor panel 6 by engaging a rear portion 4 of the front-side console 2 and a front portion 5 of the rear-side console 3 with each other.

Therefore, on the floor panel 6, a front bracket 7 and a center bracket 8 are installed with screws 9 so as to correspond to the front and rear end positions of the front-side console 2, and a transmission device 11 having a shift lever 10 is provided. Also, on the floor panel 6, a parking brake device 13 having a brake lever 12 is provided so as to correspond to the longitudinal intermediate position of the rear-side console 3, and a rear bracket 14 is installed at the rear of the parking brake device 13 with screws 9.

The front-side console 2 has a box shape extending in the vehicle longitudinal direction, the lower surface of which is open, and the upper surface of the front-side console 2 is formed into a step shape such that the rear half portion is higher than the front half portion. In the upper surface of the front-side console 2, a work opening 16 to which a garnish 15 is assembled and a lever opening 17 through which the shift lever 10 is inserted are formed in the longitudinal direction with a space being provided therebetween. Also, at a lower portion on both side surfaces close to the front of the front-side console 2, a screw hole 18 through which a screw 9 is inserted is formed so as to correspond to the front bracket 7. At a lower portion on both sides of the rear portion 4 of the front-side console 2, a floor attachment portion 20 for assembling the front-side console 2 to the center bracket 8 with a clip 19 is provided.

On the other hand, the rear-side console 3 has a box shape extending in the vehicle longitudinal direction, the front surface and the lower surface of which are open. The front portion 5 of the rear-side console 3 is formed with an opening having a downward U shape, viewed from the front, and an intermediate portion of the upper surface thereof is raised into a semicircular shape, viewed from the side. In the upper surface of the rear-side console 3, a work opening 22 for assembling a center cap 21 and an elongated operation opening 23 along which the inserted brake lever 12 can be moved over a predetermined range are formed so as to communicate with each other in the longitudinal direction. Also, at an intermediate portion on both side surfaces close to the rear of the rear-side console 3, a clip hole 24 through which a clip 19 is pressed in is formed so as to correspond to the rear bracket 14.

As shown in FIGS. 1 to 6, the cigarette lighter device 1 has a cigarette lighter body 25 and a cigarette lighter socket 26, and is assembled to the garnish 15 constituting a part of floor console box. The cigarette lighter socket 26 is electrically connected to a cigarette lighter harness 28 via a coupler 27, and at the periphery thereof is provided a through hole 29 for preventing cigarette ash from accumulating.

As the garnish 15, a large part separate from the front-side console 2 is used to provide a space which facilitates wiring between the cigarette lighter device 1 and the cigarette lighter harness 28 and allows necessary access when the cigarette lighter harness 28 is removed from the front-side console 2. For this garnish 15, the front portion and side portions around the upper surface thereof are bent downward into a flange shape, and there are provided a first storage compartment 30 located on the vehicle rear side, a second storage compartment 31 located in front of the first storage compartment 30 so as to extend to the left-hand side, and a cigarette lighter attachment portion 32 located on the left-hand side of the second storage compartment 31. The first storage compartment 30 is constructed so as to be used as a cup holder for standing a cup, a juice can, or the like.

The first storage compartment 30 and the second storage compartment 31 are formed into a downward recess shape so as to be housed in the front portion of the front-side console 2 through the work opening 16. Also, the cigarette lighter attachment portion 32 is formed into a substantially horizontal surface shape slightly inclined toward the rear of vehicle, and in the flat surface, an insertion hole 32a through which the cigarette lighter device 1 excluding the head of the cigarette lighter body 25 is inserted is formed. By being inserted through this insertion hole 32a, the cigarette lighter device 1 is disposed so as to be directed downward in a substantially vertical direction.

Figure 3:
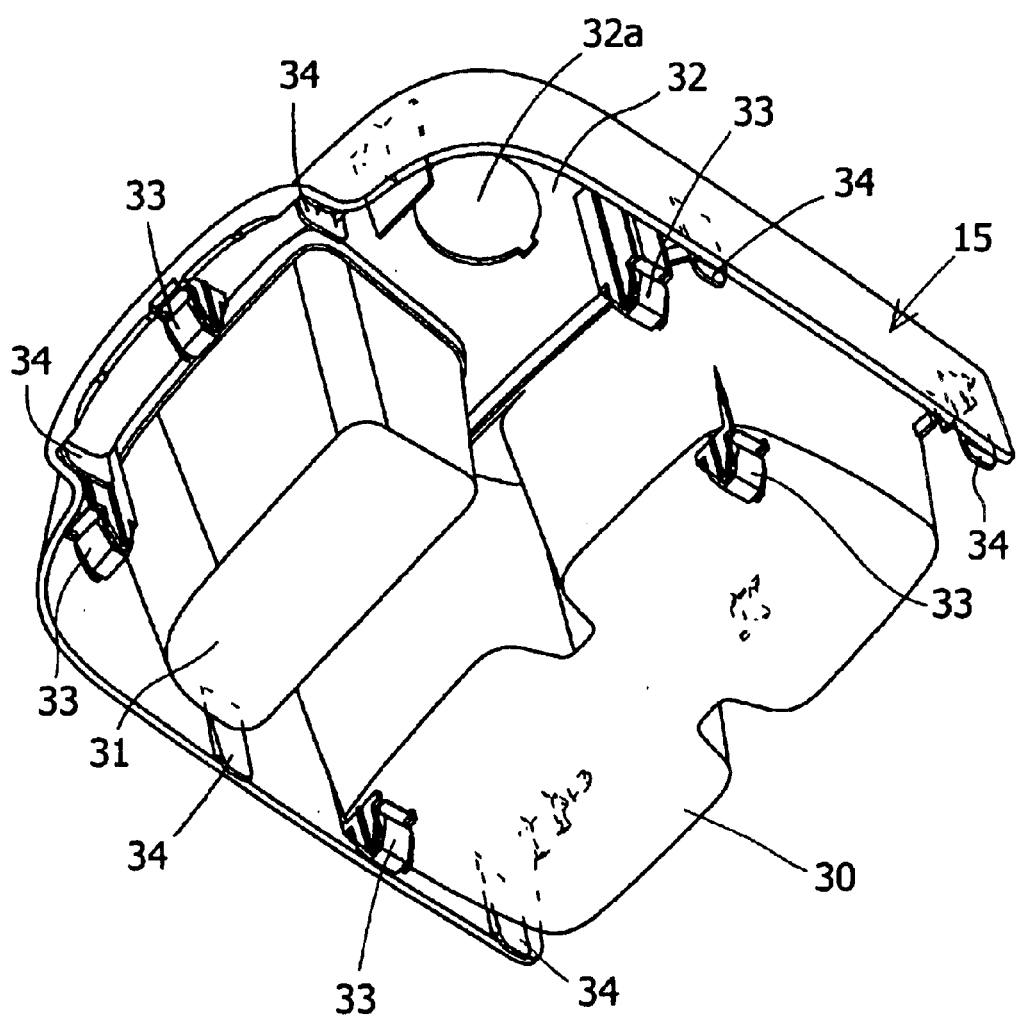
FIG. 3 is a perspective view of a garnish, viewed in the direction of arrow A of FIG. 1.
Figure 4:
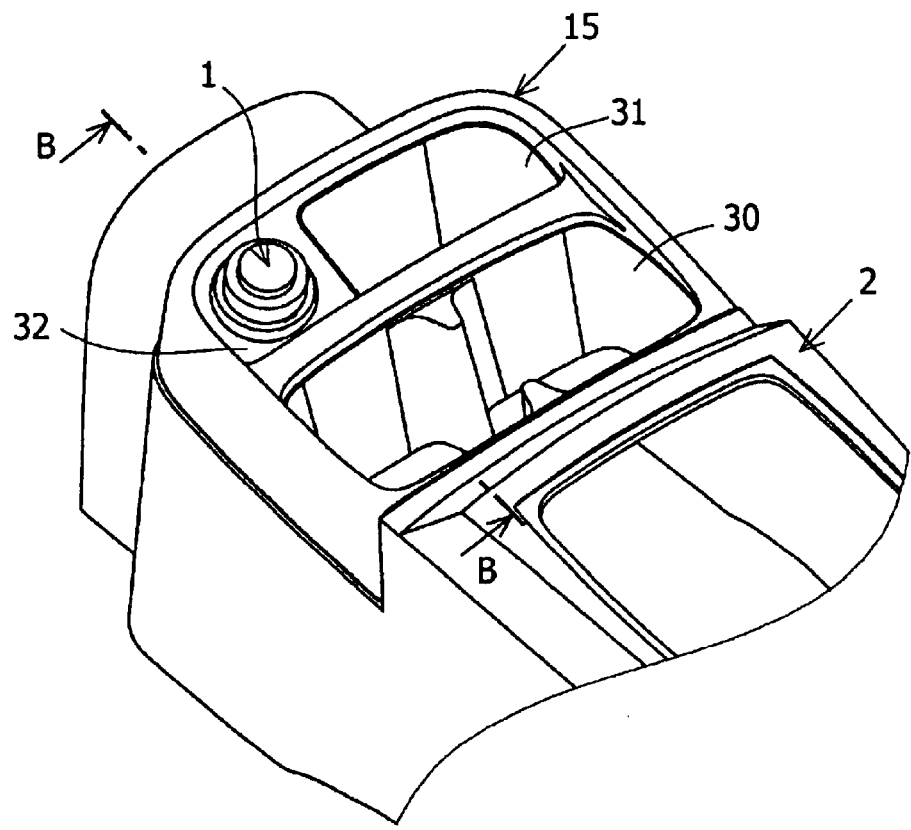
FIG. 4 is a perspective view showing a state in which a vehicular cigarette lighter device in accordance with an embodiment of the present invention is assembled to a floor console.

As shown in FIG. 3, on the lower surface side of the garnish 15, a plurality of (a total of five in this embodiment) clips 33 and a plurality of (a total of six in this embodiment) claw-shaped ribs 34, which are used when the cup holder garnish 15 is assembled to the front-side console 2, are provided. These clips 33 and claw-shaped ribs 34 are arranged at predetermined locations of the inside wall surface of the peripheral flange portion and the bottom surface of the first storage compartment 30 so as to project from the lower surface of the garnish 15 at intervals transversely and longitudinally.

On the other hand, at the upper peripheral edge of the work opening 16 in the front portion of the front-side console 2, mounting holes 35 are formed at a total of five places corresponding to the clips 33 of the garnish 15, and also insertion holes 36 are formed at a total of six places corresponding to the claw-shaped ribs 34. At a position close to the left-hand side of the front portion of the front-side console 2, which is located under the cigarette lighter attachment portion 32, a substantially horizontal ash receiving surface 37, which is formed separately from an ashtray (not shown), is provided.

Figure 1:
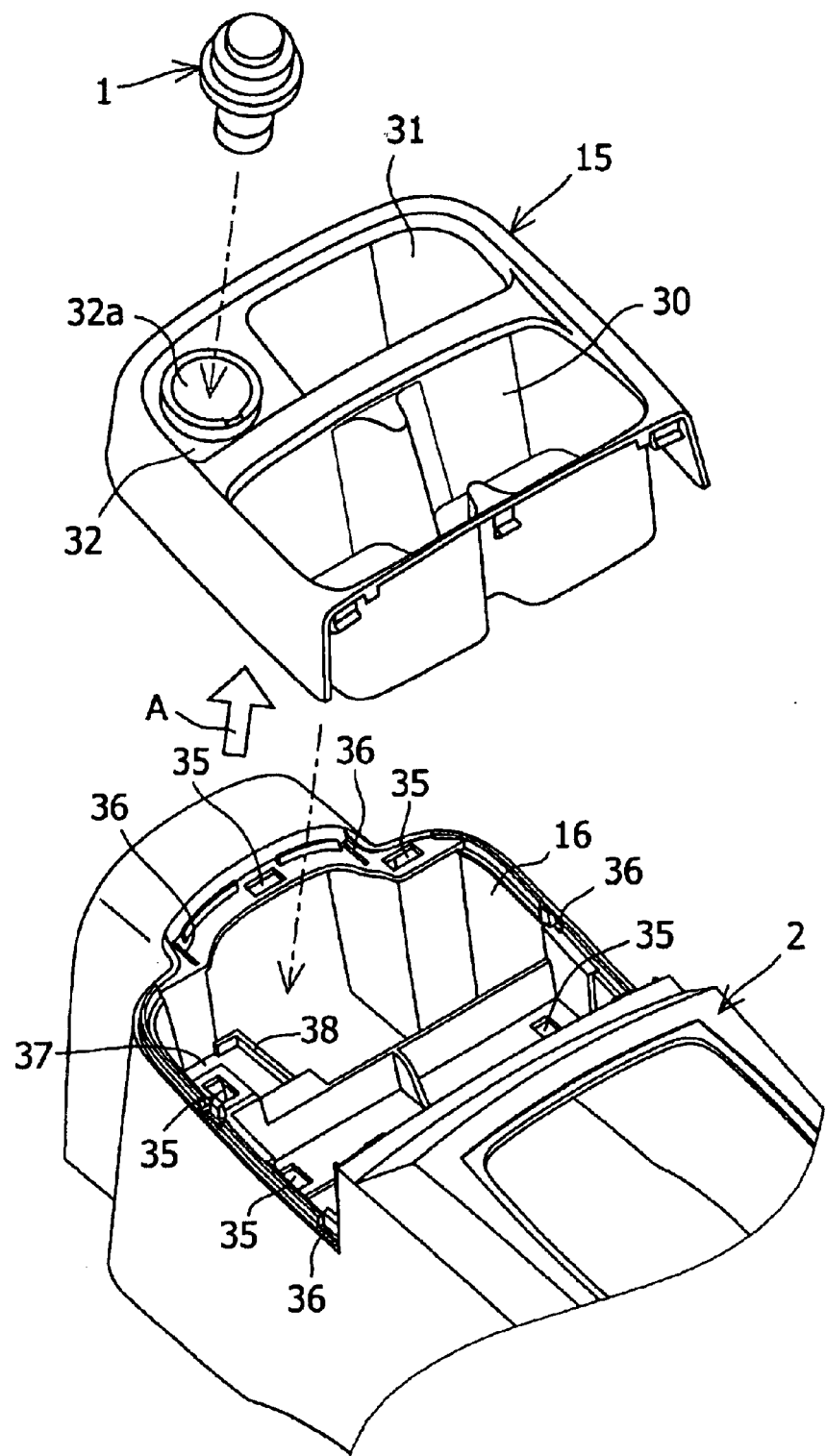
FIG. 1 is an exploded perspective view of a vehicular cigarette lighter device in accordance with an embodiment of the present invention.
Figure 2:
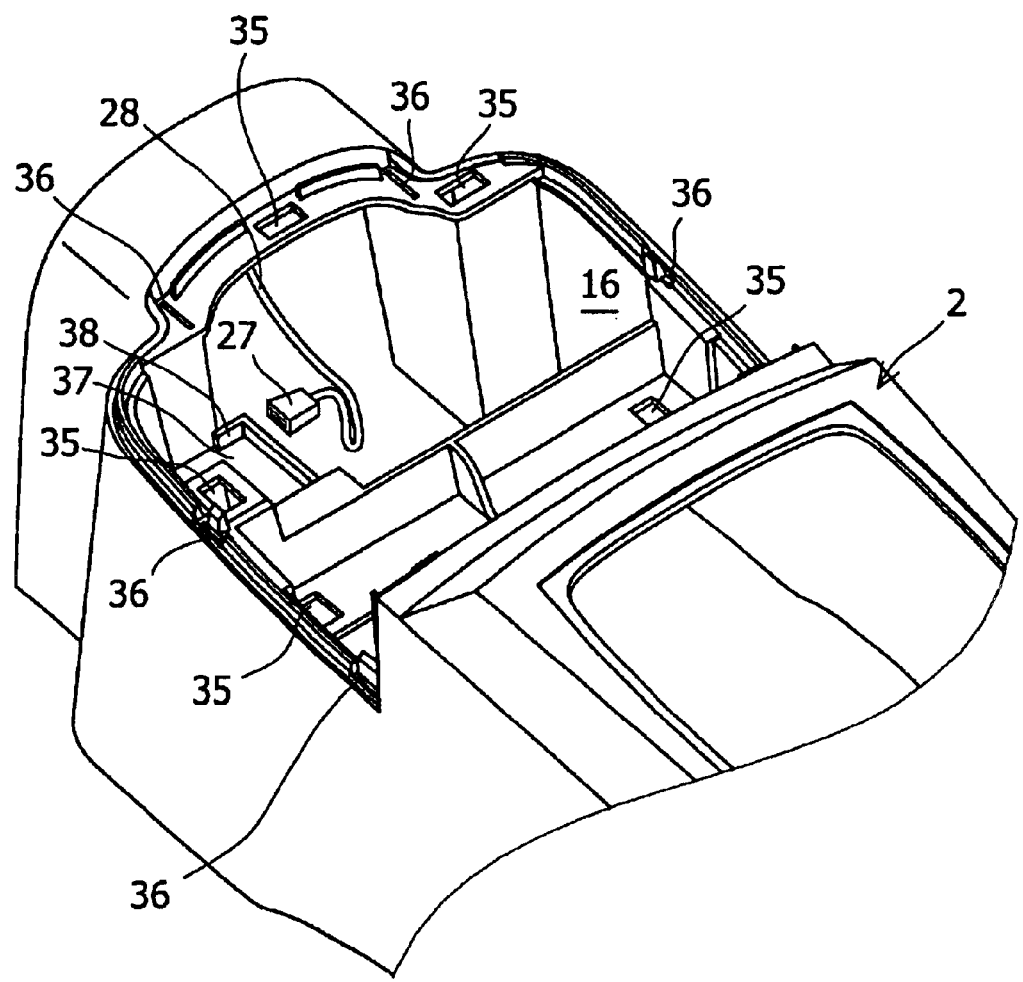
FIG. 2 is an enlarged perspective view of an essential portion of a front-side console shown in FIG. 1.

As shown in FIGS. 1, 2 and 5, the ash receiving surface 37 is formed at a height one step lower than the front upper surface of the front-side console 2, and the side surface portion is surrounded by the garnish side wall, the first storage compartment side wall, and the second storage compartment side wall. Furthermore, at the side end portion of the ash receiving surface 37, a convex portion 38 having a height surrounding the ash receiving surface 37 is formed. Therefore, in the floor console box of this embodiment, the work opening 16 is provided at the peripheral edge portion of the ash receiving surface 37, and the garnish 15 is installed at the work opening 16.

When the cigarette lighter device 1 in accordance with the embodiment of the present invention is installed, first, the split type floor console box is assembled onto the floor panel 6 of the vehicle body. Specifically, the front-side console 2 in the state shown in FIG. 7 is held by hands and placed on the floor panel 6. The front-side console 2 is assembled by fastening it to the front bracket 7 installed on the floor panel 6 with the screws 9 inserted through the screw holes 18 and by fixing it to the center bracket 8 installed on the floor panel 6 with the clips 19 pressed in through engagement holes in the floor attachment portions 20. Next, the rear-side console 3 in the state shown in FIG. 7 is held by hands, and the front portion 5 of the rear-side console 3 is lapped on the rear portion 4 of the front-side console 2 while clips are pressed in and engaged with engagement holes (not shown) in the rear portion 4 of the front-side console 2 from the upside. Then, the rear-side console 3 is assembled by fixing it to the rear bracket 14 installed to the parking brake device 13 on the floor panel 6 with the clips 19 pressed in through the clip holes 24. Thereafter, the center cap 21 is assembled between the brake lever 12 of the parking brake device 13 and the rear-side console 3.

During this time, as shown in FIGS. 1 and 2, the cigarette lighter device 1 is installed in the insertion hole 32a in the cigarette lighter attachment portion 32 of the garnish 15, and the coupler 27 and the cigarette lighter harness 28 are placed temporarily on the ash receiving surface 37 of the garnish 15. After the front-side console 2 is assembled onto the floor panel 6, as shown in FIG. 6, the garnish 15 is held by hands and is brought toward the work opening 16 from the upside. While the cigarette lighter harness 28 is connected to the cigarette lighter device 1, the clips 33 and the claw-shaped ribs 34 are engaged with the corresponding mounting holes 35 and insertion holes 36, by which the garnish 15 fitted with the cigarette lighter device 1 is assembled to the front portion of the front-side console 2 (see FIGS. 3 to 5).

In the vehicular cigarette lighter device 1 in accordance with the embodiment of the present invention, the cigarette lighter attachment portion 32 having a substantially horizontal surface shape is provided in the garnish 15, the cigarette lighter body 25 and the cigarette lighter socket 26 are inserted in the insertion hole 32a in the cigarette lighter attachment portion 32 and are disposed so as to be directed in a substantially vertical direction, and the substantially horizontal ash receiving surface 37 formed separately from the ashtray is provided on the front-side console 3 located under the cigarette lighter attachment portion 32. Therefore, in the case where the ashtray cannot be provided under the cigarette lighter device 1 disposed in the vertical direction, even if cigarette ash adhering to the cigarette lighter body 25 passes through the through hole 29 after the cigarette lighter device 1 is used, the cigarette ash can be received by the ash receiving surface 37, so that the floor panel etc. can be prevented from being made dirty by the cigarette ash.

Also, the work opening 16 that enables the worker to put his hand therein is provided at the peripheral edge portion of the ash receiving surface 37, and the garnish 15 is installed at the work opening 16. Therefore, the cigarette lighter harness 28 can be taken out easily from the downside of the front-side console 2, so that the assembling workability can be improved. Further, in the embodiment of the present invention, since the convex portion 38 is formed at the side end portion of the ash receiving surface 37, the coupler 27, the cigarette lighter harness 28, and the like can be placed temporarily on the ash receiving surface 37, so that the assembling workability of the cigarette lighter device 1 can further be improved.

Figure 9:
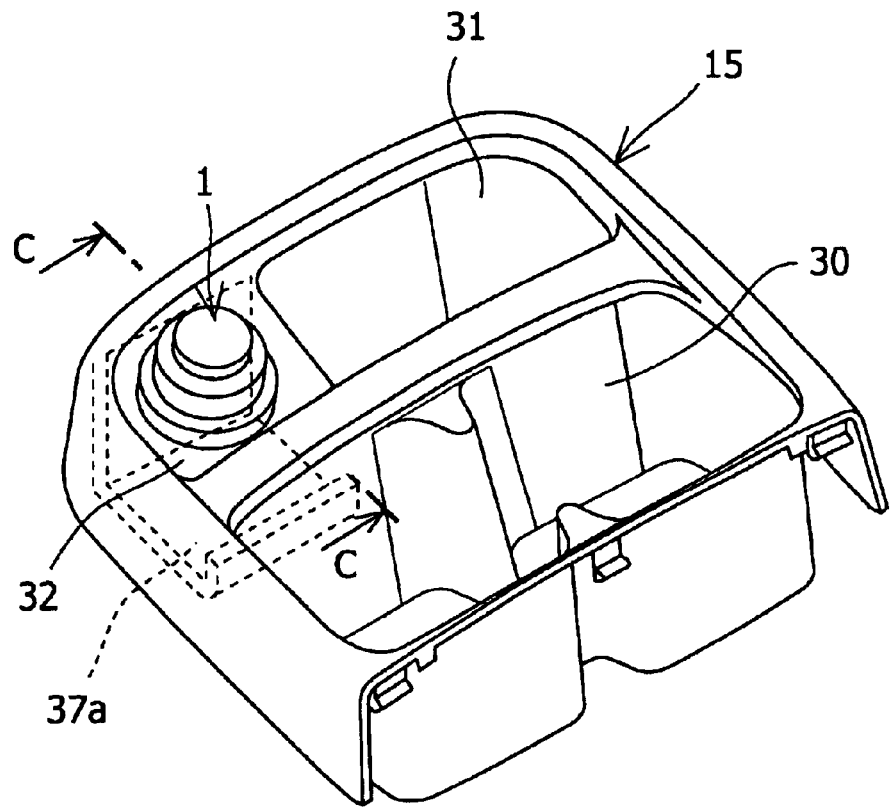
FIG. 9 is a perspective view of a vehicular cigarette lighter device in accordance with a modification of embodiment of the present invention.
Figure 10:
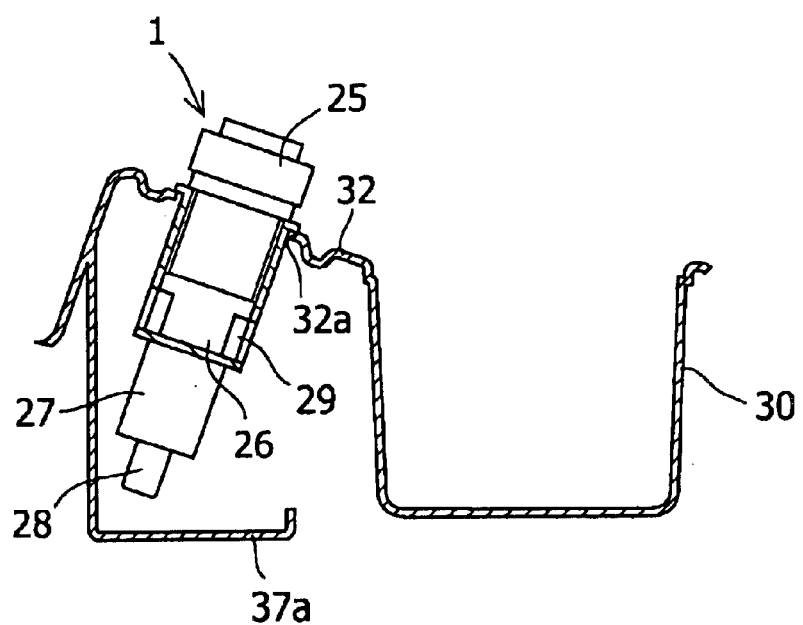
FIG. 10 is a sectional view taken along the line C—C of FIG. 9.

The above is a description of an embodiment of the present invention. The present invention is not limited to the above-described embodiment, and various modifications and changes can be made based on the technical concept of the present invention. For example, as shown in FIGS. 9 and 10, an ash receiving surface 37a may be provided on the garnish side, not on the front-side console side, by molding integrally with the cigarette lighter attachment portion 32. In this case as well, the same effect can be achieved. The ash receiving surface 37a is formed substantially into an L shape in cross section by extending and bending a part of front back surface side of the cigarette lighter attachment portion 32.

What is claimed is:

1. A vehicular cigarette lighter device in which a floor console arranged between right and left seats of a vehicle is formed by a console body and a garnish installed to said console body; a cigarette lighter attachment portion having a substantially horizontal surface shape is provided on said garnish; a cigarette lighter is disposed in said cigarette lighter attachment portion so as to be directed in a substantially vertical direction; a substantially horizontal ash receiving surface which is formed separately from an ashtray is provided on said console body located under said cigarette lighter attachment portion; a work opening is formed at a peripheral edge portion of said ash receiving surface; and said garnish is installed at said work opening.

2. The vehicular cigarette lighter device according to claim 1, wherein a lower side surface portion of the cigarette lighter attachment portion of said garnish is surrounded by a garnish side wall and a storage compartment side wall.

3. The vehicular cigarette lighter device according to any one of claims 1 to 2, wherein a convex portion is formed at a side end portion of said ash receiving surface.

* * * * *